US005640564A

United States Patent [19]
Hamilton et al.

[11] Patent Number: 5,640,564
[45] Date of Patent: Jun. 17, 1997

[54] METHOD AND APPARATUS FOR GENERATING AND USING SHORT OPERATION IDENTIFIERS IN OBJECT ORIENTED SYSTEMS

[75] Inventors: Graham Hamilton; Peter B. Kessler, both of Palo Alto, Calif.

[73] Assignee: Sun Microsystems, Inc., Mountain View, Calif.

[21] Appl. No.: 467,542

[22] Filed: Jun. 6, 1995

Related U.S. Application Data

[63] Continuation of Ser. No. 249,890, May 26, 1994, abandoned.

[51] Int. Cl.⁶ .......................... G06F 11/00; G06F 13/00
[52] U.S. Cl. .................. 395/683; 395/684; 395/182.02; 395/185.02
[58] Field of Search ........................ 395/680, 683, 395/684, 182.02, 185.01, 185.02, 185.03, 185.04

[56] References Cited

U.S. PATENT DOCUMENTS

| | | | |
|---|---|---|---|
| 4,882,674 | 11/1989 | Quint et al. | 395/684 |
| 5,187,790 | 2/1993 | East et al. | 395/725 |
| 5,218,699 | 6/1993 | Brandle et al. | 395/684 |
| 5,287,507 | 2/1994 | Hamilton et al. | 395/650 |
| 5,301,316 | 4/1994 | Hamilton et al. | 395/600 |
| 5,321,841 | 6/1994 | East et al. | 395/725 |
| 5,341,478 | 8/1994 | Travis et al. | 395/200 |
| 5,367,635 | 11/1994 | Bauer et al. | 395/683 |
| 5,377,350 | 12/1994 | Skinner | 395/684 |
| 5,450,583 | 9/1995 | Inada | 395/683 |
| 5,457,797 | 10/1995 | Butterworth et al. | 395/683 |
| 5,522,071 | 5/1996 | Guillen et al. | 395/683 |
| 5,566,302 | 10/1996 | Khalidi et al. | 395/683 |

OTHER PUBLICATIONS

Birrell, Andrew, Nelson, Greg, Owicki, Susan, and Wobber, Edward, Titled "Network Objects", *Proceedings of the Fourteenth ACM Symposium on Operating Systems Principles*, Dec. 1993 Operating Systems Review, vol. 27, No. 5, pp. 217–230.

Mitchell, James G., Gibbons, Jonathan J., Hamilton, Graham, Kessler, Peter B., Khalidi, Yousef A., Kougiouris, Panos, Madany, Peter W., Nelson, Michael N., Powell, Michael, L., and Radia, Sanjay R. Titled "An Overview of the Spring System", *1994 Spring CompCom Proceedings*, Sun Microsystems Inc.

*Primary Examiner*—Kevin A. Kriess
*Attorney, Agent, or Firm*—Blakely, Sokoloff, Taylor & Zafman LLP

[57] ABSTRACT

A distributed computer system in which a server application performs operations responsive to operation requests from a client application. The client application initially identifies an operation for the server application to perform with a short identifier of the operation. If the short identifier is ambiguous, the server application sends the client application a reply indicating that the short identifier was ambiguous. The client application responds by sending a long identifier which uniquely identifies the operation. Preferably, the short identifier of an operation is derived by performing a hash function on the long identifier of the operation. In object-oriented distributed systems, the operations are methods defined in objects supported by the server application.

20 Claims, 3 Drawing Sheets

METHOD AND APPARATUS FOR GENERATING AND USING SHORT OPERATION IDENTIFIERS IN OBJECT ORIENTED SYSTEMS

This is a continuation of application Ser. No. 08/249,890, filed May 26, 1994 now abandoned.

FIELD OF THE INVENTION

This invention generally relates to a method and apparatus for use in a distributed computer system, and more specifically to a method and apparatus for handling ambiguous operation identifiers.

BACKGROUND OF THE INVENTION

It is often desirable to have two or more computer applications simultaneously working on a single task. Computer systems which allow more than one application to work on a single task are known as distributed computer systems. When more than one application is working on a task, a mechanism must be provided through which all of the applications working on the task can communicate with each other to coordinate the processing of the task.

According to one method for coordinating the responsibilities associated with performing a task, certain applications ("client applications") are allowed to delegate certain portions of the tasks which they are executing to other applications ("server applications"). According to this strategy, a client application transmits a signal to the server application indicating an operation of the task for the server to execute. The signal also includes any data the server application may require to perform the indicated operation. Once the server application has performed the operation, the server application transmits a signal back to the client application to inform the client application that the operation has been completed. The signal also includes any data generated by the performance of the operation.

Recently, object-oriented distributed systems have been developed. In object-oriented systems, information is represented in objects which include data structures and methods. The methods define operations which may be performed on the data structures. In an object-oriented distributed system, a client application delegates operations to server applications by invoking methods defined in objects supported by the server. When a client application invokes a method on a server application, the client application must communicate to the server application exactly which method it wants to invoke. Typically, a client application communicates this information by sending the server application a method identifier which identifies the method it desires to invoke. However, under certain circumstances, a server application may support more than one method having the same method identifier. Identifiers which correspond to more than one operation are referred to herein as ambiguous identifiers. When the server application receives an ambiguous method identifier, it does not know which of the methods to perform.

The problem of ambiguous method identifiers arises when a server object inherits methods from two or more pre-existing objects. This situation is generally referred to as multiple inheritance. For example, two separate programmers may define two separate interface objects, an interface A object and an interface B object. Each programmer independently allocates the method identifiers for the methods defined in his respective interface object. It is possible that they both use the same method identifier, for example, method identifier X, for one of their methods. For example, method identifier X may identify the "load" method in the interface A object, and the "store" method in the interface B object.

If someone implements an interface C object that inherits from both the interface A object and the interface B object, the method identifier X will identify both the "load" and the "store" method in the interface C object. Further, client applications which desire to invoke either the "load" or the "store" method of the interface C object may not even be aware that there is an ambiguity. Because of inheritance, some client applications of the interface C object may only perceive the interface C object as the interface A object, whereas other client applications of the interface C object may only perceive the interface C object as the interface B object. Consequently, it cannot be assumed that client applications will even be aware that there is an ambiguity problem with respect to an identifier of a method which they desire to invoke.

One way to minimize the potential for such method identifier collisions is to adopt a scheme which employs relatively long method identifiers. For example, if 16 byte method identifiers are used instead of 4 byte method identifiers, the possibility of ambiguous method identifiers is reduced. The possibility of ambiguous identifiers may be further minimized if programmers universally adopt certain method identifier selection rules of thumb.

Unfortunately, the performance of a computer system decreases with the size of the identifiers which must be passed between client and server applications. Conversely, performance may be increased by reducing the size of the method identifiers. Specifically, the smaller the method identifier, the less data that must be transmitted from the client to the server. In addition, when the server application decodes an incoming request, it must map the method identifier contained in the request to a specific method in the server application. This mapping process is much more efficient with shorter method identifiers.

As is evident by the foregoing, it is clearly desirable to provide an object-oriented distributed system in which client applications may invoke methods on objects belonging to server applications. It is further desirable to provide an object-oriented distributed system which allows programmers to allocate relatively short method identifiers to their methods. Since the use of relatively short method identifiers increases the possibility of method identifier collisions, it is clearly desirable to provide a mechanism for resolving conflicts caused by ambiguous short method identifiers.

SUMMARY OF THE INVENTION

According to one aspect of the present invention, a distributed computer system including one or more processors executing a client application and a server application is provided. The server application is capable of executing a plurality of operations. Each operation is identified by at least one operation identifier of a plurality of operation identifiers. Each operation identifier identifies one or more operations.

The client application issues a first request to the server application for the server application to perform a selected operation. The client application identifies the selected operation by transmitting a first operation identifier in the first request. The first operation identifier is an operation identifier which identifies the selected operation.

The server application performs the selected operation when the first operation identifier identifies only the selected operation. The server application transmits a notification to the client application notifying the client application that the first operation identifier was ambiguous and that the selected operation was not performed when the first operation identifier identifies more than one operation.

The client application issues a second request to the server application for the server application to perform the selected operation when the client receives the notification from the server application. The client application identifies the selected operation by transmitting a second operation identifier in the second request. The second operation identifier is a second operation identifier which identifies the selected operation. The second operation identifier is a different operation identifier than the first operation identifier.

The plurality of operation identifiers include a plurality of short operation identifiers and a plurality of long operation identifiers. Each operation is identified by a short operation identifier from the plurality of short operation identifiers. Each operation further is identified by a long operation identifier from the plurality of long operation identifiers.

The first operation identifier is a short operation identifier which identifies the selected operation. The second operation identifier is a long operation identifier which identifies the selected operation.

Each short operation identifier is preferably derived by performing a hash function on a long operation identifier. A short operation identifier derived by performing the hash function on a given long operation identifier identifies the same operation as the given long operation identifier.

The hash function is known to both the client application and the server application. Each of the client application and the server application independently derives the plurality of short operation identifiers from the plurality of long operation identifiers.

According to one embodiment, the plurality of operations are a plurality of procedures. According to another embodiment, the plurality of operations are a plurality of methods that are to be called on one or more objects.

If the plurality of operations are a plurality of methods that are to be called on one or more objects, then the server application is aware of the methods supported by the one or more objects. The server application determines which short operation identifiers are ambiguous when the one or more objects are compiled.

According to another aspect of the invention, a server application for use in a distributed computer system is provided. The distributed computer system includes one or more processors executing the server application and at least one client application. The server application includes an execution unit, an input unit operatively coupled to the execution unit and the server application, and an output unit operatively coupled to the execution unit and the server application.

The execution unit is capable of executing a plurality of operations. Each operation is identified by at least one operation identifier of a plurality of operation identifiers. Each operation identifier identifies one or more operations. The input unit receives a first request from the at least one client application. The first request requests the server application to perform a selected operation. The first request identifies the selected operation by a first operation identifier.

The execution unit executes the selected operation when the first operation identifier identifies only the selected operation. The output unit transmits a notification to the client application notifying the client application that the first operation identifier was ambiguous and that the selected operation was not performed when the first operation identifier identifies more than one operation.

The input unit receives a second request from the client application for the server application to perform the selected operation when the client receives the notification from the server application. The selected operation is identified by a second operation identifier in the second request. The second operation identifier is a different operation identifier than the first operation identifier.

The plurality of operation identifiers include a plurality of short operation identifiers and a plurality of long operation identifiers. Each operation is identified by a short operation identifier from the plurality of short operation identifiers. Each operation further is identified by a long operation identifier from the plurality of long operation identifiers. The first operation identifier is a short operation identifier which identifies the selected operation. The second operation identifier is a long operation identifier which identifies the selected operation.

Preferably, the server application derives each short operation identifier by performing a hash function on a corresponding long operation identifier. A short operation identifier derived by performing the hash function on a given long operation identifier identifies the same operation as the given long operation identifier.

The plurality of operations may be a plurality of methods that are to be called on one or more objects. The server application is aware of the methods supported by the one or more objects. The server application determines which short operation identifiers are ambiguous when the one or more objects are compiled.

According to yet another aspect of the invention, a method for handling ambiguous identifiers in a distributed computer system is provided. The distributed computer system includes one or more processors executing a server application and at least one client application. The server application is capable of executing a plurality of operations.

According to one aspect of the method, each operation is identified by at least one operation identifier of a plurality of operation identifiers. Each operation identifier identifies one or more operations. The at least one client application issues a first request to the server application for the server application to perform a selected operation. The at least one client application identifies the selected operation by transmitting a first operation identifier in the first request. The first operation identifier is an operation identifier which identifies the selected operation.

The server application performs the selected operation when the first operation identifier identifies only the selected operation. The server application transmits a notification to the at least one client application notifying the at least one client application that the first operation identifier was ambiguous and that the selected operation was not perforated when the first operation identifier identifies more than one operation.

The at least one client application issues a second request to the server application for the server application to perform the selected operation when the at least one client receives the notification from the server application. The at least one client application identifies the selected operation by transmitting a second operation identifier in the second request. The second operation identifier is a second operation identifier which identifies the selected operation. The second operation identifier is a different operation identifier than the first operation identifier.

The plurality of operation identifiers include a plurality of short operation identifiers and a plurality of long operation identifiers. Each operation is identified by identifying each operation with a short operation identifier from the plurality of short operation identifiers, and identifying each operation by a long operation identifier from the plurality of long operation identifiers. The first operation identifier is a short operation identifier which identifies the selected operation. The second operation identifier is a long operation identifier which identifies the selected operation. Preferably, each short operation identifier is derived by performing a hash function on a corresponding long operation identifier.

BRIEF DESCRIPTION OF THE DRAWINGS

The invention may best be understood by referring to the following description and accompanying drawings which illustrate the invention. In the drawings.

DETAILED DESCRIPTION

Figure 1:
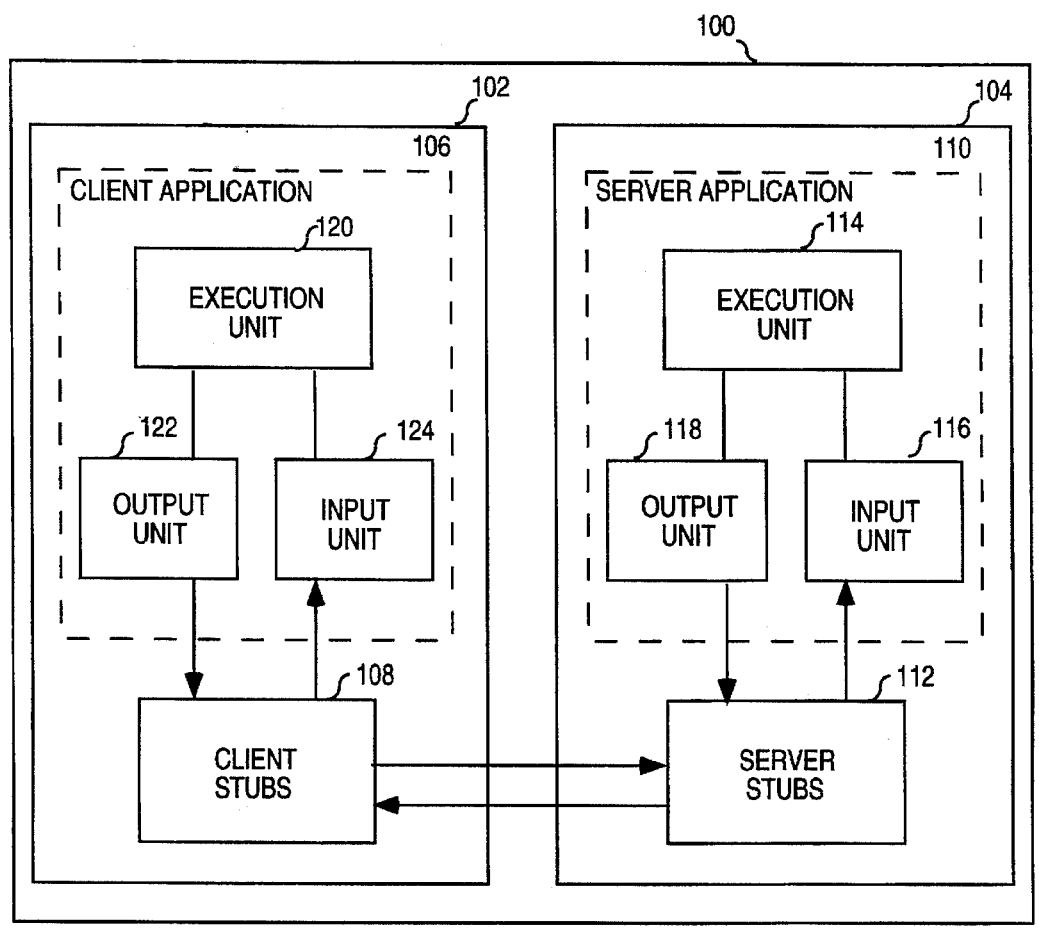
FIG. 1 is a block diagram of a distributed system including a client application and a server application according to one embodiment of the invention.

FIG. 1 illustrates a block diagram of a distributed computer system 100 according to one embodiment of the invention. System 100 includes two processors 102 and 104. Processor 102 is executing a client application 106 and client stubs 108. Processor 104 is executing a server application 110 and server stubs 112.

For the purposes of explanation, system 100 has been illustrated with a one-to-one correspondence between processors and applications. However, in alternative embodiments, a single processor may execute multiple applications, and multiple processors may execute a single application. For example, both client application 106 and server application 110 may be executed by processor 102, or portions of client application 106 may be executing on both processor 102 and processor 104.

Also for the purposes of explanation, system 100 has been illustrated with only one client application and one server application. However, in alternative embodiments, multiple client applications and multiple server applications may be present in a distributed system. Therefore, system 100 is to be considered an exemplary distributed system for illustrating the present invention, and does not limit the invention with respect to the number of processors present, number of applications present, or distribution of the applications among the processors.

Server application 110 generally represents a program capable of executing any one of a plurality of operations responsive to requests from client applications. Server application 110 generally includes an execution unit 114 for performing operations, an input unit 116 for receiving requests to perform operations, and an output unit 118 for transmitting the results of operations.

Client application 106 generally represents a program for executing a task. The execution of a task typically involves the performance of a series of operations. Client application 106 includes an execution unit 120 which may perform some or all of the operations required by the task, an output unit 122 for transmitting requests for the server application 110 to perform some or all of the operations required by the task, and an input unit 124 for receiving the results of operations that client application 106 delegated to server application 110.

Client stubs 108 and server stubs 112 are agents which assist in the communications between client application 106 and server application 110. Specifically, when client application 106 sends an operation request to server application 110, client stubs 108 package and transmit the operation request and server stubs 112 receive and unpackage the server request. Once the server application 110 has performed the operation identified in the operation request, server stubs 112 package and transmit the results of the operation, and client stubs 108 receive and unpackage the results of the operation. The use of stubs to facilitate communication between applications running in different address spaces or on different processors is generally known in the art.

Each operation supported by server application 110 is preferably identified by a long operation identifier and a short operation identifier. Each long operation identifier is unique to the operation it identifies. The uniqueness of long operation identifiers preferably results from the universal adoption of certain identifier selection rules of thumb. Various sets of rules may achieve the desired unique correspondence and are known to those skilled in the art. The present invention is not limited to any specific set of such rules.

Preferably, the short operation identifier of each given operation is derived by performing a hash function on the long operation identifier for the given operation. Since hash functions do not produce a one to one correspondence, each short operation identifier may identify more than one operation. For example, a hash function may map a first long operation identifier "OPEN_FILE_VERSION" identifying a first operation to a short operation identifier "#5", and a second long operation identifier "EDIT-OPEN-FILE" identifying a second operation to the same short operation identifier "#5". As a result, the short operation identifier "#5" will identify both the first and the second operation.

In the preferred embodiment, client application 106 initially transmits operation requests which identify an operation to be performed by the short operation identifier of the operation. Transmission of the short operation identifier rather than the long operation identifier is preferred in order to reduce the size of messages transmitted between client application 106 and server application 110. Transmission of the short operation identifier is also preferred because server application 110 can identify the operation based on the short operation identifier more efficiently than server application 110 can identify the operation based on the long operation identifier.

As mentioned above, a short identifier may identify more than one operation. Therefore, when server application 110 receives an operation request which includes a short identifier which identifies more than one operation (an "ambiguous short identifier"), server application 110 will not be able to determine which of the operations corresponding to the ambiguous short identifier it should execute. The mechanism for handling ambiguous short identifiers shall now be explained with reference to FIGS. 2a and 2b.

Figure 2A:
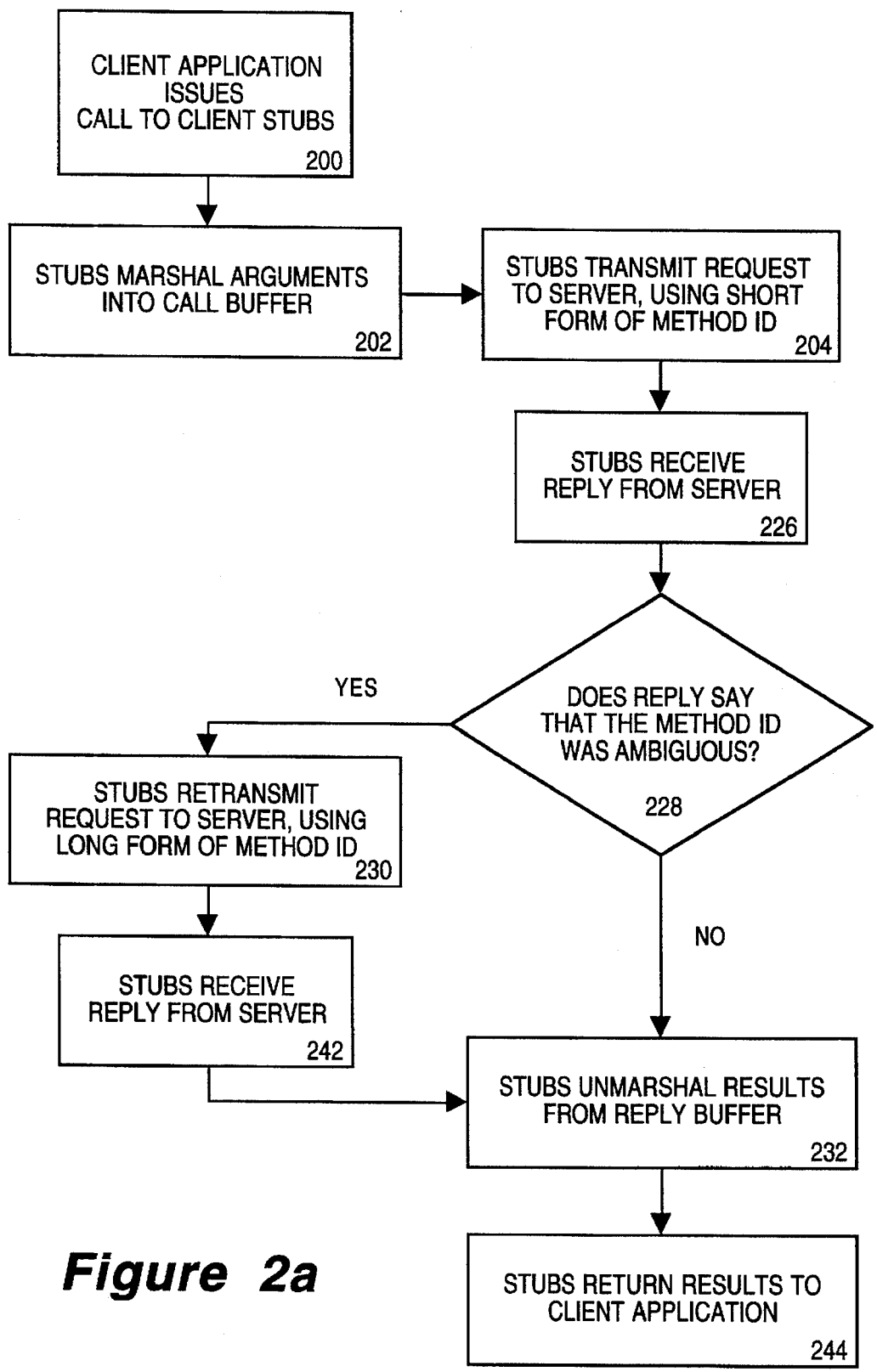
FIG. 2a is a flow chart illustrating the operation of the client application shown in FIG. 1.
Figure 2B:
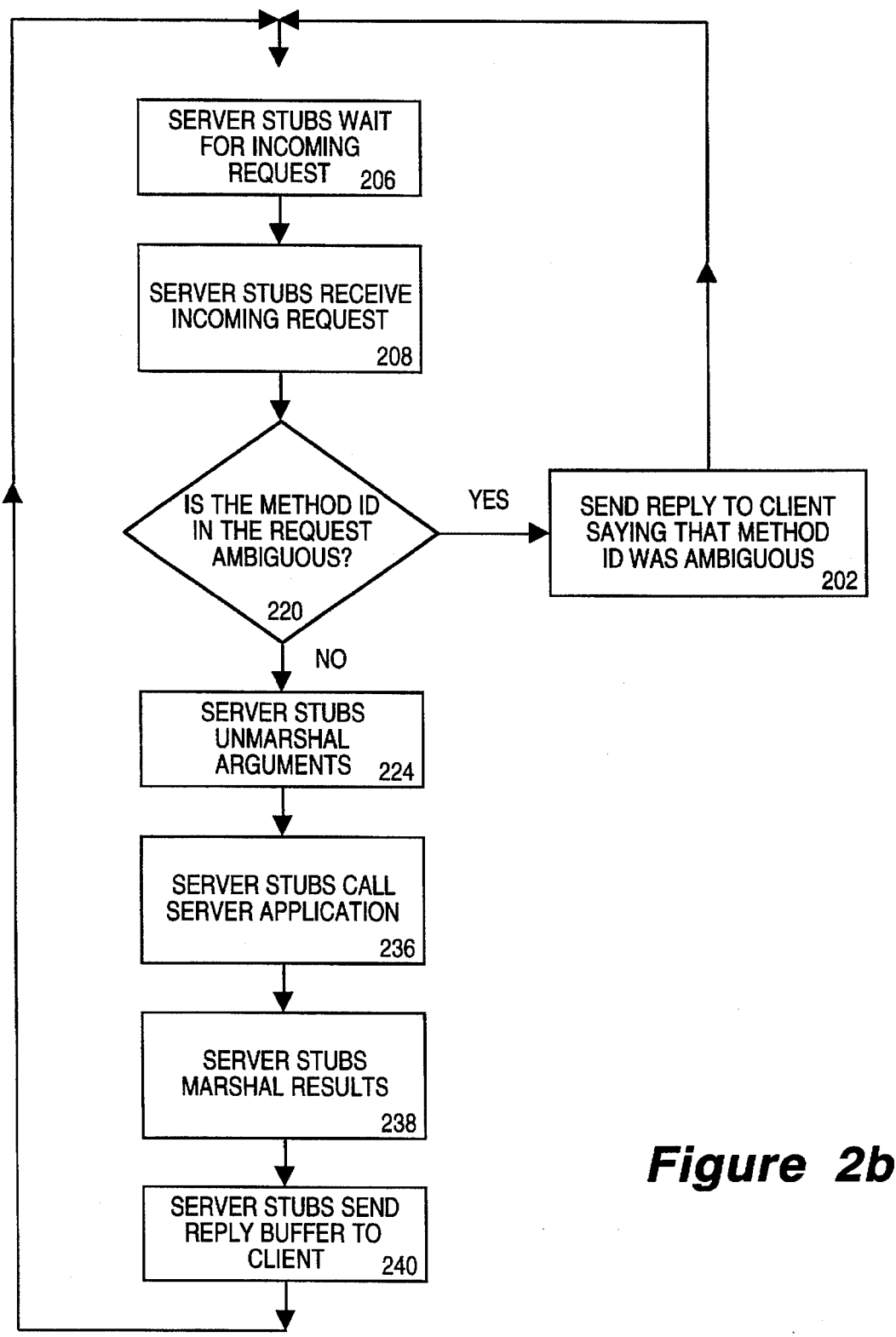
FIG. 2b is a flow chart illustrating the operation of the server application shown in FIG. 1.

FIG. 2a illustrates a flow chart of the operation of the portion of server application 106 which invokes operations on server application 110. FIG. 2b illustrates a flow chart of the operation the portion of server application 110 which handles operation requests sent by client application 106.

At step 200, the client application 106 issues a call to client stubs 108. The call identifies an operation (the "requested operation") to be performed by server application 110, and values for any arguments required by the requested operation. For example, client application 106 may issue a call requesting the server application 110 to perform the "OPEN_FILE_VERSION" operation. However, rather than use the long operation identifier "OPEN_FILE_VERSION" in the operation request, client application uses "#5", the short operation identifier derived by performing a hash function on the long operation identifier.

At step 202, the client stubs 108 marshal any arguments required by the requested operation into a call buffer (not shown). At step 204 the client stubs 108 transmit the operation request to the server stubs 112. The operation request transmitted at step 204 identifies the requested operation by the short operation identifier, "#5".

Turning now to FIG. 2b, the server stubs 112 initially wait for incoming operation requests, as shown at step 206. Server stubs 112 receive the incoming operation request at step 208. Server application 110 then determines whether the operation identifier in the operation request is ambiguous at step 220. If the operation identifier is ambiguous, then control passes to step 222. If the operation identifier is not ambiguous, then control passes to step 224.

In the present example, the operation identifier in the operation request (the "transmitted operation identifier") is the short operation identifier "#5". If "#5" identifies more than one operation supported by server application 110, then it is ambiguous. In the present example, it shall be assumed that server application 110 supports both the "OPEN_FILE_VERSION" operation and a "EDIT-OPEN-FILE" operation, and that the short operators for both of these operations are "#5". Therefore, "#5" is an ambiguous short operation identifier and control will pass to step 222.

In step 222, server application 110 sends client application 106 a reply which indicates that the transmitted operation identifier was ambiguous and that the requested operation was therefore not performed. Control then passes back to step 206, where the server stubs 112 await the arrival of further operation requests.

In step 226 of FIG. 2a, the client stubs 108 receive the reply from the server application 110. In step 228, the client application 106 determines whether the reply indicates that the operation identifier was ambiguous. If the operation identifier was ambiguous, control passes to step 230. If the operation identifier was not ambiguous, control passes to step 232. In the present example, the reply will indicate that the short identifier "#5" was ambiguous. Therefore, control passes to step 230.

In step 230, the client stubs 108 retransmit the operation request to the server application 110, but identify the requested operation by its long operation identifier rather than its short operation identifier. In the present example, client stubs 108 retransmit the operation request and identify the requested operation with the long operation identifier "OPEN_FILE_VERSION".

In step 208 of FIG. 2b, server stubs 112 receive the operation request from the client stubs 108. Server application 110 then determines whether the operation identifier in the operation request is ambiguous at step 220. If the operation identifier is ambiguous, then control passes to step 222. If the operation identifier is not ambiguous, then control passes to step 224. In the present example, the operation request is the long operation identifier "OPEN_FILE_VERSION". Long operation identifiers identify only one operation. Therefore, the long operation identifier "OPEN_FILE_VERSION" is not ambiguous, and control will pass to step 224.

At step 224, server stubs 112 unmarshal any arguments stored in the operation request and pass the arguments to the server application 110. At step 236 server stubs 112 call the server application 110, causing the execution unit 114 of the server application 110 to execute the operation identified in the operation request using the values unmarshaled from the operation request. In the present example, server application 110 executes the "OPEN_FILE_VERSION" operation.

At step 238, the server stubs 112 marshal the results of the performed operation in a reply buffer. For example, if the performed operation was a multiplication of two values, then the product of the two values will be placed in the reply buffer by server stubs 112. Once the results of the operation have been marshaled, the server stubs 112 send the reply in the reply buffer to the client stubs 108 in step 240. After the reply has been sent, control passes back to step 206 where the server stubs 112 wait for another operation request.

At step 242 in FIG. 2a, the client stubs 108 receive the reply from the server application 110. Since the last transmitted operation request identified the requested operation by its long operation identifier, it may be assumed that the server application 110 performed the operation and that the reply contains the results of the operation. Therefore, at step 232 the client stubs 108 unmarshal the results from the reply. At step 244, the client stubs 108 return the results of the operation to the client application 106.

If the short identifier of the requested operation had not been ambiguous, the server application 110 would have performed the requested operation without further communication with the client application 106. Since a good hash function will rarely produce duplicate short identifiers, additional inter-application communication will not be necessary the vast majority of the time. However, in the rare event that a short identifier is ambiguous, system 100 will not simply crash or produce unpredictable results. One particularly effective hash function is to first encrypt the long operation identifier with a standard encryption function such as DES, and then calculate a 32 bit CRC (cyclic redundancy check) checksum of the encrypted value. The presently preferred hash function is a simple 32 bit CRC checksum of the long operation identifier.

According to one embodiment, the client application 106 may indicate the presence of a long operation identifier in a operation request by transmitting, along with the operation request, a reserved word in the place of a short operation identifier. When the server application 110 receives an operation request with the reserved word as its short identifier, the server application 110 knows to extract the long operation identifier from the operation request.

In the preferred embodiment, system 100 is an object oriented system. Therefore, the operations requested in operation requests and performed by server application 110 are methods belonging to objects supported by server application 110. However, the present invention is not limited to object oriented systems. For example, the operations requested in operation requests may simply be procedures that the client application 106 desires to invoke on the server application 110. In this context, a procedure is any operation which is not associated with an object.

Preferably, both the server application and the client application are aware of both the long operation identifiers and the hash function used to create short operation identifiers. Therefore, the server and client applications can independently generate identical short operation identifiers from the set of long operation identifiers. In addition, the server application 110 preferably knows the entire list of long operation identifiers at the time the server application 110 is compiled. Therefore, while the objects in the server application 110 are compiled, all of the short operation identifiers can be determined. As a result, any collisions between any of the short operation identifiers may be detected. Because the collisions are detected at compile-time, the server application 110 may include code generated to handle the specific short identifier collisions detected.

While specific embodiments of the present invention have been described, various modifications and substitutions will, by this disclosure, become apparent to one skilled in the art. Such modifications and substitutions are within the scope of the present invention, and are intended to be covered by the following claims.

What is claimed is:

1. A computer system comprising:
   at least one processor executing
      a client application; and
      a server application, said server application being coupled to said client application;
   wherein said server application executes a plurality of operations, each operation of said plurality of operations being identified by at least one operation identifier of a plurality of operation identifiers, each operation identifier of said plurality of operation identifiers identifying one or more operations of said plurality of operations;
   wherein said client application issues a first request to said server application for said server application to perform a selected operation of said plurality of operations, said client application identifying said selected operation by transmitting a first operation identifier in said first request, wherein said first operation identifier is one of said plurality of operation identifiers, wherein said first operation identifier identifies said selected operation;
   wherein said server application performs said selected operation when said first operation identifier identifies only said selected operation; and
   wherein said server application transmits a notification to said client application notifying said client application that said first operation identifier was ambiguous and that said selected operation was not performed when said first operation identifier identifies more than one operation of said plurality of operations.

2. The computer system of claim 1 wherein said client application issues a second request to said server application for said server application to perform said selected operation when said client receives said notification from said server application, said client application identifying said selected operation by transmitting a second operation identifier in said second request, wherein said second operation identifier is one of said plurality of operation identifiers, wherein said second operation identifier identifies said selected operation, said second operation identifier being a different operation identifier than said first operation identifier.

3. The computer system of claim 2 wherein said plurality of operation identifiers include a plurality of short operation identifiers and a plurality of long operation identifiers, each operation of said plurality of operations being identified by a short operation identifier from said plurality of short operation identifiers, each operation of said plurality of operations further being identified by a long operation identifier from said plurality of long operation identifiers, wherein for each operation of said plurality of operations, the short operation identifier that identifies the operation is shorter than the long operation identifier that identifies the operation.

4. The computer system of claim 3 wherein said first operation identifier is one of said plurality of short operation identifiers, wherein said first operation identifier identifies said selected operation, wherein said second operation identifier is one of said plurality of long operation identifiers, wherein said second operation identifier identifies said selected operation.

5. The computer system of claim 4 wherein each short operation identifier of said plurality of short operation identifiers is derived by performing a hash function on a long operation identifier of said plurality of long operation identifiers, wherein a short operation identifier derived by performing said hash function on a given long operation identifier identifies the same operation as said given long operation identifier.

6. The computer system of claim 5 wherein said hash function is known to both said client application and said server application, wherein each of said client application and said server application independently derives said plurality of short operation identifiers from said plurality of long operation identifiers.

7. The computer system of claim 1 where said plurality of operations are a plurality of procedures.

8. The computer system of claim 1 wherein said plurality of operations are a plurality of methods that are to be performed on at least one object supported by said server application.

9. The computer system of claim 6 wherein said plurality of operations are a plurality of methods that are to be called on at least one object supported by said server application, said server application being aware of said plurality of long operation identifiers supported by said at least one object, said server application determining which short operation identifiers of said plurality of short operation identifiers are ambiguous when said at least one object is compiled.

10. A server application for use in a computer system, the computer system including at least one processor executing said server application and at least one client application, the server application comprising:
   an execution unit;
   an input unit operatively coupled to said execution unit and said server application; and
   an output unit operatively coupled to said execution unit and said server application;
   wherein said execution unit executes a plurality of operations, each operation of said plurality of operations being identified by at least one operation identifier of a plurality of operation identifiers, each operation identifier of said plurality of operation identifiers identifying one or more operations of said plurality of operations;
   wherein said input unit receives a first request from said at least one client application, said first request requesting said server application to perform a selected operation of said plurality of operations, said first request identifying said selected operation by a first operation identifier, wherein said first operation identifier is one of said plurality of operation identifiers, wherein said first operation identifier identifies said selected operation;
   wherein said execution unit executes said selected operation when said first operation identifier identifies only said selected operation; and
   wherein said output unit transmits a notification to said at least one client application notifying said at least one client application that said first operation identifier was ambiguous and that said selected operation was not performed when said first operation identifier identifies more than one operation of said plurality of operations.

11. The server application of claim 10 wherein said input unit receives a second request from said at least one client application for said server application to perform said selected operation when said client application receives said notification from said server application, said selected operation being identified by a second operation identifier in said second request, wherein said second operation identifier is one of said plurality of operation identifiers, wherein said second operational identifier identifies said selected operation, said second operation identifier being a different operation identifier than said first operation identifier.

12. The server application of claim 11 wherein said plurality of operation identifiers include a plurality of short operation identifiers and a plurality of long operation identifiers, each operation of said plurality of operations being identified by a short operation identifier from said plurality of short operation identifiers, each operation of said plurality of operations further being identified by a long operation identifier from said plurality of long operation identifiers, wherein, for each operation of said plurality of operations, the short operation identifier that identifies the operation is shorter than the long operation identifier that identifies the operation.

13. The server application of claim 12 wherein said first operation identifier is a short operation identifier of said plurality of short operation identifiers which identifies said selected operation, said second operation identifier being a long operation identifier of said plurality of long operation identifiers which identifies said selected operation.

14. The server application of claim 13 wherein said server application derives each short operation identifier of said plurality of short operation identifiers by performing a hash function on a corresponding long operation identifier of said plurality of long operation identifiers, wherein a short operation identifier derived by performing said hash function on a given long operation identifier identifies the same operation as said given long operation identifier.

15. The server application of claim 10 wherein said plurality of operations are a plurality of methods that are to be performed on at least one object supported by said server application.

16. The server application of claim 14 wherein said plurality of operations are a plurality of methods that are to be called on at least one object supported by said server application, said server application being aware of said plurality of long operation identifiers supported by said at least one object, said server application determining which short operation identifiers of said plurality of short operation identifiers are ambiguous when said at least one object is compiled.

17. A method for handling ambiguous identifiers in a computer system, the computer system including at least one processor executing a server application and at least one client application, said server application being capable of executing a plurality of operations, the method comprising the steps of:

identifying each operation of said plurality of operations by at least one operation identifier of a plurality of operation identifiers, each operation identifier of said plurality of operation identifiers identifying one or more operations of said plurality of operations;

at least one client application issuing a first request to said server application for said server application to perform a selected operation of said plurality of operations, said at least one client application identifying said selected operation by transmitting a first operation identifier in said first request, wherein said first operation identifier is one of said plurality of operation identifiers, wherein said first operation identifier identifies said selected operation;

said server application performing said selected operation when said first operation identifier identifies only said selected operation; and said server application transmitting a notification to said at least one client application notifying said at least one client application that said first operation identifier was ambiguous and that said selected operation was not performed when said first operation identifier identifies more than one operation of said plurality of operations.

18. The method of claim 17 further including the step of at least one client application issuing a second request to said server application for said server application to perform said selected operation when said at least one client receives said notification from said server application, said at least one client application identifying said selected operation by transmitting a second operation identifier in said second request, wherein said second operation identifier is one of said plurality of operation identifiers, wherein said second operation identifier identifies said selected operation, said second operation identifier being a different operation identifier than said first operation identifier.

19. The method of claim 18 wherein said plurality of operation identifiers include a plurality of short operation identifiers and a plurality of long operation identifiers, said step of identifying each operation of said plurality of operations including the steps of:

identifying each operation of said plurality of operations by a short operation identifier from said plurality of short operation identifiers; and identifying each operation of said plurality of operations by a long operation identifier from said plurality of long operation identifiers;

said first operation identifier being a short operation identifier of said plurality of short operation identifiers which identifies said selected operation, said second operation identifier being a long operation identifier of said plurality of long operation identifiers which identifies said selected operation, wherein said short operation identifier is shorter than said long operation identifier.

20. The method of claim 19 further including the step of deriving each short operation identifier of said plurality of short operation identifiers by performing a hash function on a corresponding long operation identifier of said plurality of long operation identifiers, wherein a short operation identifier derived by performing said hash function on a given long operation identifier identifies the same operation as said given long operation identifier.

* * * * *